(12) United States Patent
Liu et al.

(10) Patent No.: US 12,374,134 B2
(45) Date of Patent: Jul. 29, 2025

(54) OBJECTS AUTOMATIC LABELING METHOD AND SYSTEM APPLYING THE SAME

(71) Applicant: INDUSTRIAL TECHNOLOGY RESEARCH INSTITUTE, Hsinchu (TW)

(72) Inventors: Chih-Neng Liu, Tainan (TW); Hung-Chun Chou, Taipei (TW); Tsann-Tay Tang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 424 days.

(21) Appl. No.: 18/086,976

(22) Filed: Dec. 22, 2022

(65) Prior Publication Data

US 2024/0212372 A1 Jun. 27, 2024

(51) Int. Cl.
*G06V 20/70* (2022.01)
*G06T 7/70* (2017.01)
(Continued)

(52) U.S. Cl.
CPC ............... *G06V 20/70* (2022.01); *G06T 7/70* (2017.01); *G06V 10/751* (2022.01); *G06V 10/771* (2022.01); *G06V 2201/06* (2022.01)

(58) Field of Classification Search
CPC .... G06V 20/70; G06V 10/771; G06V 10/751; G06V 2201/06; G06T 7/70
See application file for complete search history.

(56) References Cited

U.S. PATENT DOCUMENTS 10,055,670 B2 8/2018 Konishi
2010/0215254 A1* 8/2010 Prokhorov ............ G06V 20/58
340/995.28
(Continued)

FOREIGN PATENT DOCUMENTS

CN 111738103 A 10/2020
CN 112800255 A 5/2021
(Continued)

OTHER PUBLICATIONS

Taiwanese Office Action and Search Report for Taiwanese Application No. 111149431, dated Jul. 31, 2023.
(Continued)

*Primary Examiner* — Syed Haider
(74) *Attorney, Agent, or Firm* — Birch, Stewart, Kolasch & Birch, LLP

(57) ABSTRACT

An automatic objects labeling method includes: capturing M consecutive image frames at one station of an assembly line. Performing an object detection step which includes selecting a detection image frame that displays an operation using a work piece against a target object from the M consecutive image frames; and calibrating the position range of the target object in the detection image frame; retracing from the detection image frame to select an Nth retraced image frame from the M consecutive image frames; obtaining a labeled image of the target object from the Nth retraced image frame according to the position range; comparing the labeled image with images of the M consecutive image frames to find at least one other labeled image similar to the target object; and storing both the labeled image and the at least one other labeled image as the same labeled data set.

18 Claims, 3 Drawing Sheets

(51) Int. Cl.
  *G06V 10/75* (2022.01)
  *G06V 10/771* (2022.01)

(56) References Cited

U.S. PATENT DOCUMENTS

| | | | |
|---|---|---|---|
| 2016/0110592 | A1 | 4/2016 | Maeda et al. |
| 2020/0193222 | A1* | 6/2020 | Singh ...................... G06N 3/08 |
| 2021/0065217 | A1 | 3/2021 | Glaser et al. |
| 2022/0101016 | A1 | 3/2022 | Sachdeva et al. |
| 2022/0282306 | A1 | 9/2022 | Radhakrishnan et al. |
| 2022/0379475 | A1* | 12/2022 | Tang ......................... G06T 7/11 |
| 2024/0046613 | A1* | 2/2024 | Miyamoto ............ B07C 5/3425 |
| 2025/0028300 | A1* | 1/2025 | Balzer ................... G06V 10/82 |

FOREIGN PATENT DOCUMENTS

| | | |
|---|---|---|
| KR | 10-2022-0090203 A | 6/2022 |
| TW | 201140470 A1 | 11/2011 |
| TW | 201915943 A | 4/2019 |
| TW | 201928140 A | 7/2019 |
| TW | 201937405 A | 9/2019 |

OTHER PUBLICATIONS

Dube et al., "Automatic Labeling of Data for Transfer Learning," Proceedings of the IEEE/CVF Conference on Computer Vision and Pattern Recognition (CVPR), 2019, pp. 122-129.

Elezi et al., "Not All Labels Are Equal: Rationalizing the Labeling Costs for Training Object Detection," 2022 IEEE/CVF Conference on Computer Vision and Pattern Recognition (CVPR), 2022, pp. 14492-14501.

Kim et al., "Accurate auto-labeling of chest X-ray images based on quantitative similarity to an explainable AI model," Nature Communications, vol. 13, No. 1867, 2022, pp. 1-15.

Liu et al., "Flame: A Self-Adaptive Auto-Labeling System for Heterogeneous Mobile Processors," ACM: Transactions on Graphics, vol. 37, No. 4, 2021, pp. 1-14.

Park et al., "Auto-labeling of Sensor Data Using Social Media Messages: A Case Study for a Smart City," The 36th ACM/SIGAPP Symposium on Applied Computing (SAC '21), Mar. 22-26, 2021, pp. 752-760.

Shi et al., "Auto-Dialabel: Labeling Dialogue Data with Unsupervised Learning," Proceedings of the 2018 Conference on Empirical Methods in Natural Language Processing, Brussels, Belgium, Oct. 31-Nov. 4, 2019, pp. 684-689.

* cited by examiner

OBJECTS AUTOMATIC LABELING METHOD AND SYSTEM APPLYING THE SAME

BACKGROUND OF THE DISCLOSURE

Field of the Disclosure

The disclosure relates in general to an objects automatic labeling method and a system applying the same, and more particularly to an objects automatic labeling method and system applying an artificial intelligence (AI) in assembly lines.

Description of the Related Art

AI is a technology using computer programs to perform data analysis and information decision-making. It can be applied to various fields, such as the automation of production lines, energy saving, and improvement of operational efficiency. At present, it has become the development trend of major industries in the world.

The first step of industrial AI application is defining the operation process and analyzing the operation content in order to provide computers standardized data for performing a machines learning process. To take an AI application in computer vision as an example, in order to make the computer having the ability of recognizing images, it is necessary to define a specific range (bounding box) on the image screen and give it a standardized annotation serving as a "standard answer" for recognizing different objects during the machine learning process. These procedures for recognizing the raw data of operation process and operation content is called data labeling.

However, data labeling seems simple but quite cumbersome, and requires a lot of manpower and time (consuming more than 80% time of the entire AI project) cost. And if data labeling was performed manually, it may negatively affect the basis of machine learning standard answers due to human subjective bias.

Therefore, there is a need to provide an advanced objects automatic labeling method and a system applying the same to overcome the drawbacks of the prior art.

SUMMARY OF THE DISCLOSURE

One embodiment of the present disclosure is to provide an automatic objects labeling method, wherein the automatic objects labeling method includes steps as follows: Firstly, M consecutive image frames are captured at one station of an assembly line. An object detection step is then performed, wherein the object detection step includes selecting a detection image frame that displays an operation using a work piece against a target object from the M consecutive image frames; and calibrating the position range of the target object in the detection image frame. A retracing is performed from the detection image frame to select an Nth retraced image frame from the M consecutive image frames, and a labeled image of the target object is obtained from the Nth retraced image frame according to the position range. The labeled image is compared with images of the M consecutive image frames to find at least one other labeled image similar to the target object. The labeled image and the at least one other labeled image similar to the target object are both stored as the same labeled data set.

Another embodiment of the present disclosure is to provide an automatic objects labeling system, wherein the automatic objects labeling system includes an image capturing device, an object detection module and a correlation comparison module. The image capturing device is used to capture M consecutive image frames at one station of an assembly line. The object detection module is used to perform an object detection step. The object detection step includes selecting a detection image frame that displays an operation using a work piece against a target object from the M consecutive image frames; determining the position range of the target object in the detection image frame; retracing from the detection image frame to select an Nth retraced image frame from the M consecutive image frames; and obtaining a labeled image of the target object from the Nth retraced image frame according to the position range. The correlation comparison module is used to compare the labeled image with images of the M consecutive image frames to find at least one other labeled image similar to the target object; and to store both the labeled image and the at least one other labeled image similar to the target object as the same labeled data set.

According to the above embodiments, an objects automatic labeling method and a system applying the same are provided. A two-stage AI module is applied to label objects to be labeled in M consecutive image frames captured at one station of an assembly line. Firstly, the AI module is train and built by manual verification, and the AI module is then used to determine the position range of a target object using a work piece participating in an operation process as a reference, wherein the work piece is operated against the target object during the operation process. After extracting the image feature parameters of the target object, an unsupervised learning algorithm (for example, association) is used to find at least one image similar to that of the target object in the M consecutive image frames according to these image feature parameters. The image of the target object and the at least one image similar to that of the target object are then stored as the same labeled data set.

It can greatly reduce the labor cost and time consumption by applying the AI module to perform data labeling. And since the data labeling is performed based on an objective criterion of whether the work piece is operated against the target object during the operation process, thus the inaccurate problem of machine learning caused by human subjective bias can be obviated.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides an objects automatic labeling method and a system applying the same to reduce the labor cost and time consumption of data labeling, and at the same time to obviate the inaccurate problem of machine learning caused by human subjective bias. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1:
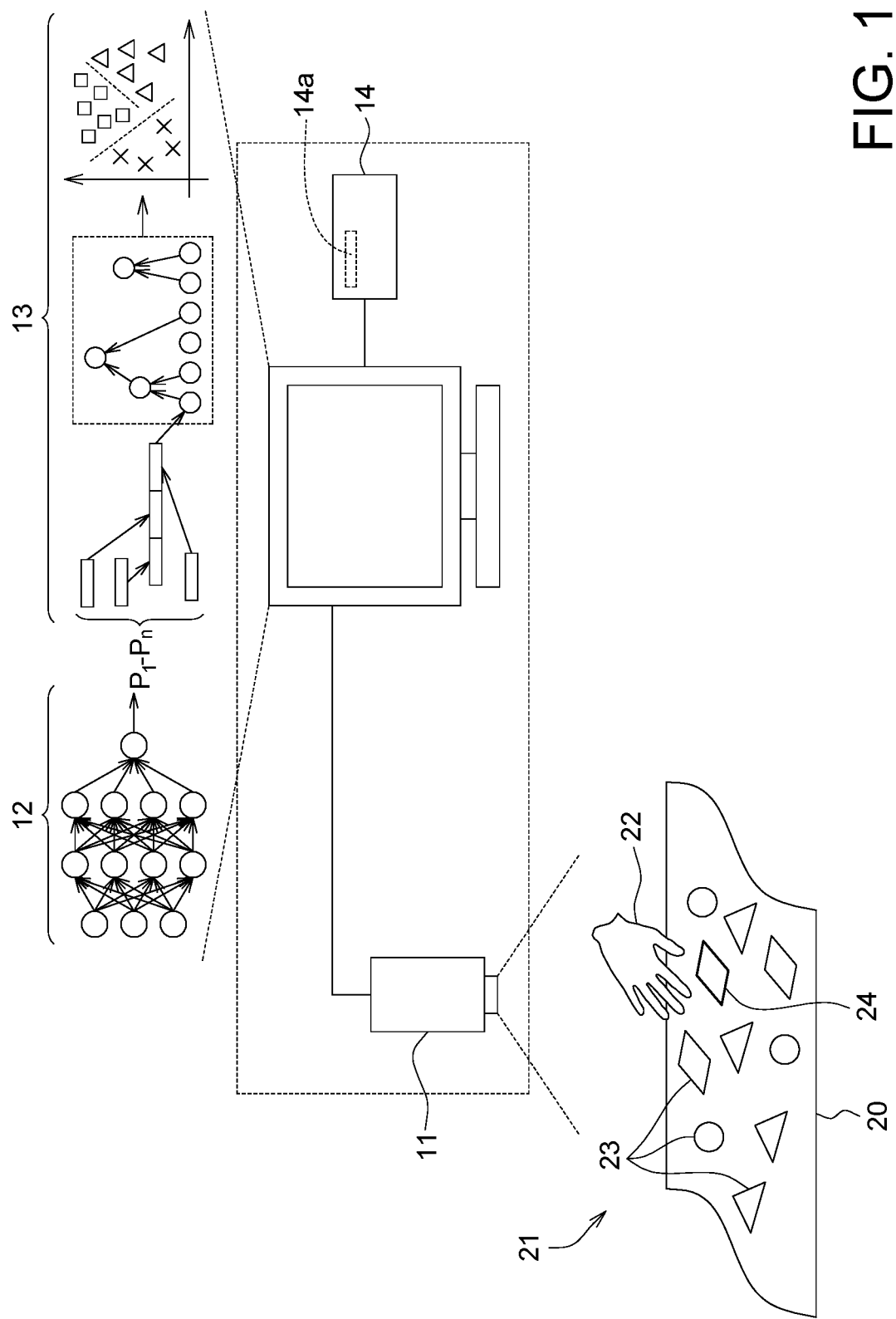
FIG. 1 is a block diagram illustrating the functional configuration of an objects automatic labeling system according to one embodiment of the present disclosure.
Figure 2:
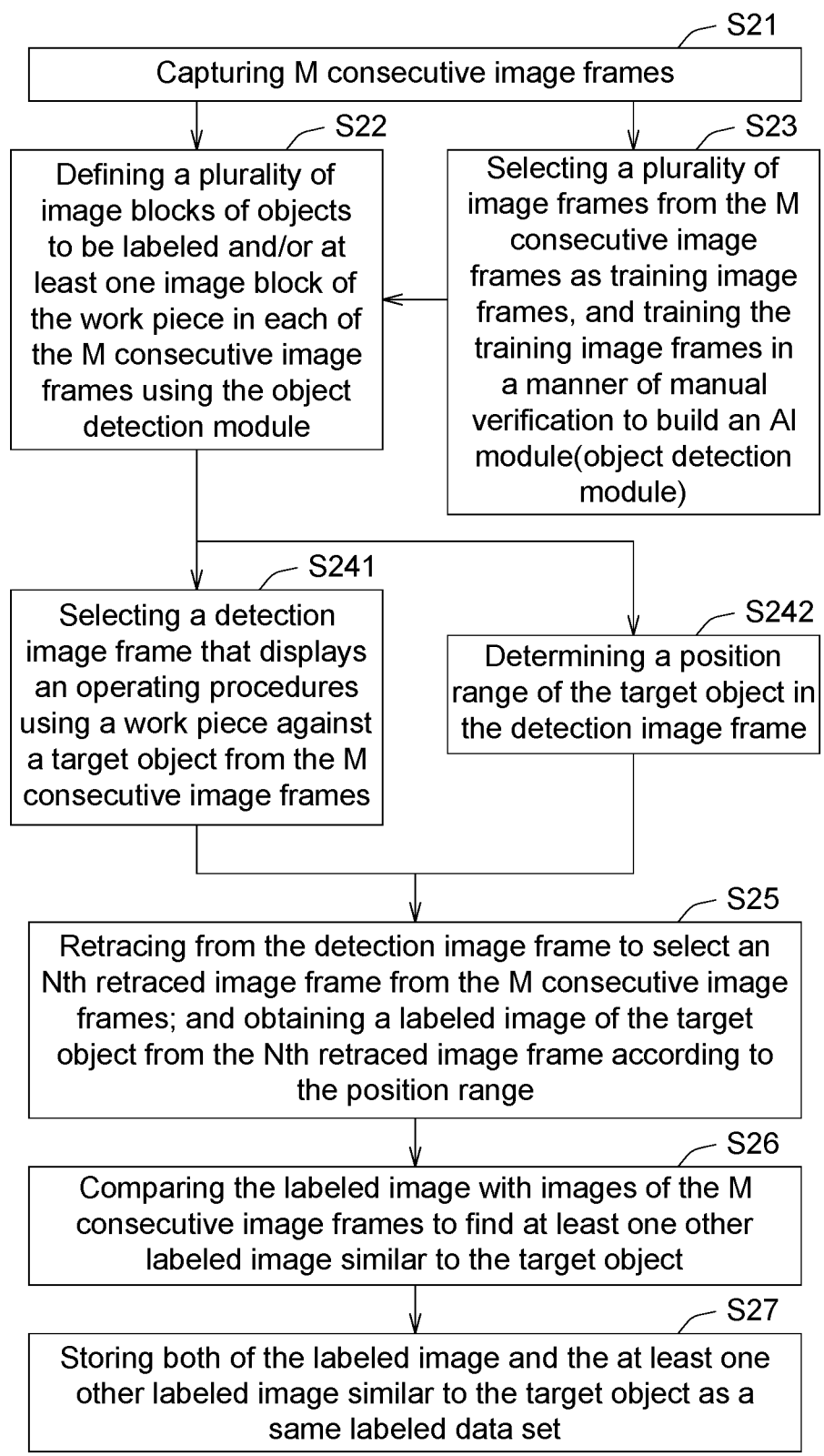
FIG. 2 is a flowchart of an objects automatic labeling method using the objects automatic labeling system depicted in FIG. 1 according to one embodiment of the present disclosure.
Figure 3:
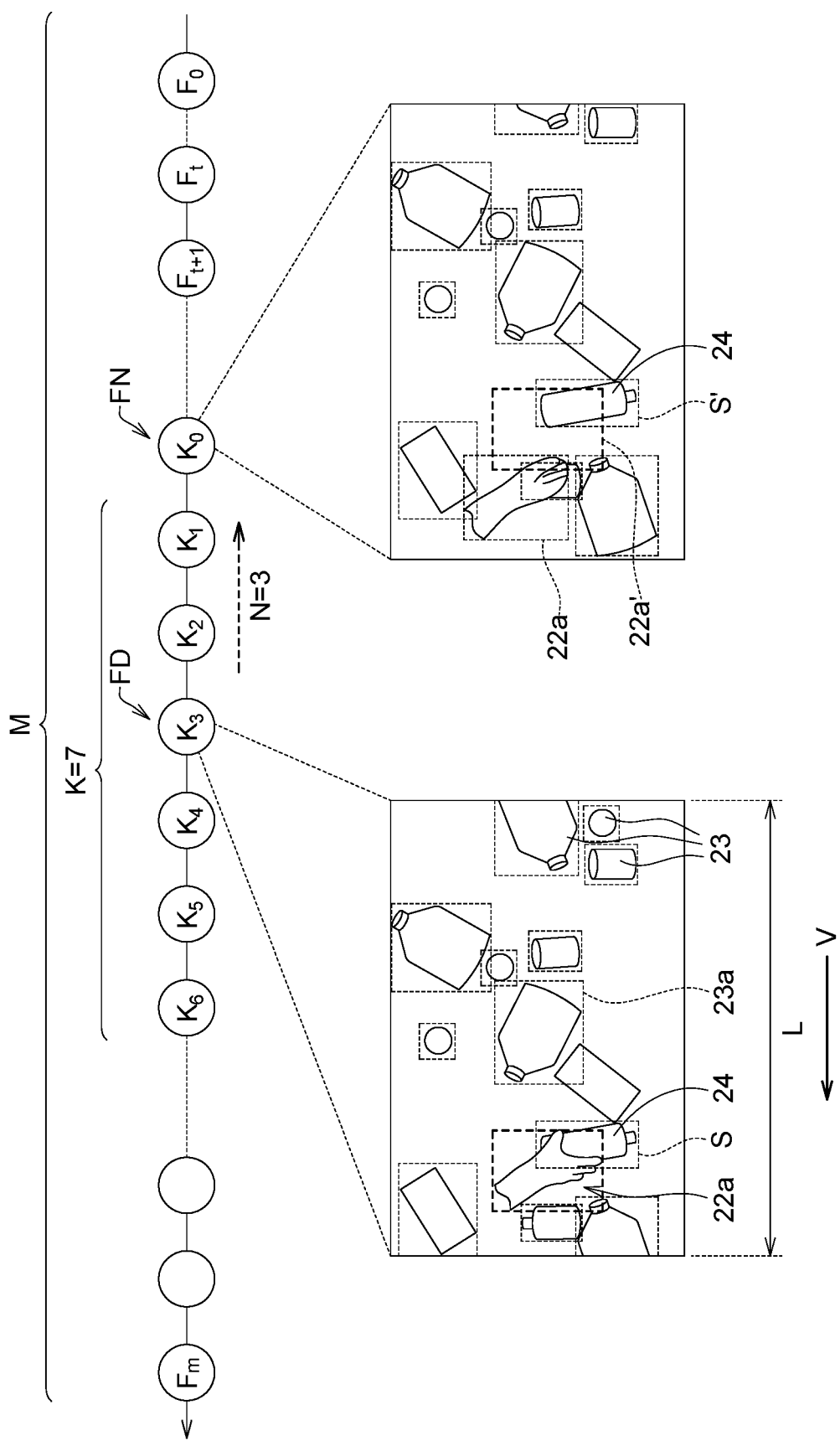
FIG. 3 is a schematic diagram illustrating changes in partial image frames when the objects automatic labeling method depicted in FIG. 2 is performed according to one embodiment of the present disclosure.

Referring to FIGS. 1 to 3, FIG. 1 is a block diagram illustrating the functional configuration of an objects automatic labeling system 10 according to one embodiment of the present disclosure; FIG. 2 is a flowchart of an objects automatic labeling method using the objects automatic labeling system 10 depicted in FIG. 1 according to one embodiment of the present disclosure; and FIG. 3 is a schematic diagram illustrating changes in partial image frames when the objects automatic labeling method depicted in FIG. 2 is performed according to one embodiment of the present disclosure.

In some embodiments of the preset disclosure, the objects automatic labeling system 10 is configured in an assembly line 20, wherein operation procedures carried out at the station 21 of the assembly line 20 may include processing, picking, sorting, printing, marking or other processing of a target object using a work piece. For example, in the present embodiment, the assembly line 20 may include a conveyor belt. The operating procedures carried out at the station 21 include picking (sorting) out specific types of plastic products (i.e., a target object 24) from a variety of different plastic products (i.e., objects to be labeled 23) in the conveyor belt by at least one picking worker wearing gloves 22 (i.e., the work pieces).

As shown in FIG. 1, the objects automatic labeling system 10 includes an image capture device 11, an object detection module 12, a correlation comparison module 13 and a database 14. The image capturing device 11 is built in the assembly line 20, and is used for monitoring the operation procedure carried out at the station 21 (as shown in step S21 of FIG. 2) to capture M consecutive image frames $F_0$-$F_m$ (M is a positive integer greater than 1). In some embodiments of the present disclosure, the image capture device 11 may include at least one digital camera or video camera.

In the present embodiment, when the image capture device 11 photographs a variety of different plastic products (i.e., the objects to be labeled) 23 delivered by the conveyor belt and passing through the station 21 of the assembly line 20 for about 4.5 minutes, about 8100 consecutive image frames (that is, M is equal to 8100) can be captured by the image capture device 11. The frame rate (FPS) of the M consecutive image frames $F_0$-$F_m$ captured by the image capture device 11 is 30 frames per second.

The object detection module 12 is used to perform an object detection step, wherein the object detection step includes steps as follows: Firstly, (as shown in step S22 of FIG. 2) a plurality of image blocks 23a of the objects to be labeled and/or at least one image block 22a of the work piece are defined in each of the M consecutive image frames $F_0$-$F_m$ using the object detection module 12.

In some embodiments of the present disclosure, the step of using the object detection module 12 to define a plurality of image blocks 23a of objects to be labeled and/or at least one image block 22a of the work piece in each of the M consecutive image frames $F_0$-$F_m$ includes using an AI module, such as a faster region-based convolutional neural networks (Faster R-CNN), a YOLOv4 and other suitable AI modules, for performing the object detection step. For example, in some embodiments of the present disclosure, an object detection AI module can be used for performing an image detection process on each of the M consecutive image frames $F_0$-$F_m$ to define a plurality of image blocks 23a of objects to be labeled corresponding to the images of the plastic products (i.e., the objects to be labeled 23) displayed in the M consecutive image frames $F_0$-$F_m$.

In the present embodiment, as shown in FIG. 3, the M consecutive image frames $F_0$-$F_m$ include K consecutive operation frames $K_0$-$K_6$ appearing the gloves 22 worn by picking worker. The consecutive operation frames $K_0$-$K_2$ show the process that the picking worker's glove 22 moves toward the target object 24; the operation frame $K_3$ shows that the picking worker's glove 22 begins to grab the target object 24; the consecutive operation frames $K_4$-$K_6$ show the process that the target object 24 grasped by the picking worker's glove 22 moving out of the image frames (i.e., out of the conveyor belt). When the image frames (such as, the K consecutive operation frames $K_0$-$K_6$) includes the picking worker's glove 22 (i.e. the work pieces), the object detection module 12 not only can define a plurality of image blocks 23a of objects to be labeled corresponding to the images of the plastic products (i.e., the objects to be labeled 23) but also can define the image blocks 22a of the picking worker's glove 22 (i.e., the work pieces) in the corresponding image frames.

In some embodiments of the present disclosure, the step of using the object detection module 12 to define a plurality of image blocks 23a of objects to be labeled and/or at least one image block 22a of the work piece in each of the M consecutive image frames $F_0$-$F_m$ includes sub-steps as follows: Firstly, an intersection ratio of the image block 22a of the work piece over each one of the image blocks 23a of the objects to be labeled (including the target object 24) in each of the K consecutive operation frames $K_0$-$K_6$ is calculated. After that, the image frames (such as, the operation frames $K_3$-$K_6$) with the largest intersection ratio can be selected from the K consecutive operation frames $K_0$-$K_6$, and it can be determined that the work piece (the picking worker's glove 22) performs a specific operation procedure against the target object 24. For example, in some embodiments of the present disclosure, when the number (for example, 4) of the image frames (e.g., the operation frames $K_3$-$K_6$) with the largest intersection ratio among the K consecutive operation frames $K_0$-$K_6$ is greater than H, it can be determined that a specific type of plastic (the target object 24) has been grasped by the picking worker's glove 22 (i.e., the work pieces). Wherein H is a positive integer greater than 2 (H>2), and in the present embodiment, the number of H may be 3.

In the present embodiment, the largest intersection ratio of the image block 22a of the work piece to each one of the image blocks 23a of objects to be labeled in each of the K consecutive operation frames $K_0$-$K_6$ is the largest overlapping area ratio of the image block 22a over the image blocks 23a (among the K consecutive operation frames $K_0$-$K_6$), as shown in equation (1):

$$\text{MAX}\left\{\frac{\text{area of image blocks } 23a \cap \text{area of the image block } 22a}{\text{area of the image block } 23a}\right\} \quad (1)$$

In some embodiments of the present disclosure, as shown in step S23 of FIG. 2, a plurality of image frames may be optionally selected from the M consecutive image frames $F_0$-$F_m$ as training image frames $F_0$-$F_t$ (as shown in FIG. 3), and the selected training image frames $F_0$-$F_t$ can be trained in a manner of manual verification to build an AI module (i.e., the object detection module 12) for performing the step S22 to define a plurality of image blocks 23a of the objects to be labeled and/or at least one image block 22a of the work piece. For example, in the present embodiment, the AI module (i.e., the object detection module 12) can be built by a machine learning (ML) technology based on convolutional neural network algorithms. At the same time, the 120 image frames in the first minute of the 8100 consecutive image frames (that is, M equals 8100) captured by the image capture device 11 for 4.5 minutes are selected as the training frames $F_0$-$F_t$, and the 120 image frames can be trained in a manner of manual verification to build the AI module (i.e., the object detection module 12). In some embodiments of the present disclosure, the AI module suitable for building the object detection module 12 may be, for example, a Faster R-CNN, a YOLOv4 or a combination thereof.

Next, as shown in step S241 in FIG. 2, a detection image frame FD is selected from the M consecutive image frames $F_0$-$F_m$. For example, in some embodiments of the present disclosure, the so-called detection image frame FD is an image frame that can initially determine that the picking worker's glove 22 (i.e., the work piece) has grasped the specific type of plastic product (i.e., the target object 24). In the present embodiment, the detection image frame FD is selected from the image frames of M consecutive image frames $F_0$-$F_m$ excluding the training frames $F_0$-$F_t$. The detection image frame FD can be determined by choosing the first one (such as the operation frame $K_3$) of the image frames (such as, the operation frames $K_3$-$K_6$) appearing the picking worker's glove 22 (K is a positive integer greater than 1).

At the same time, as shown in step S242 in FIG. 2, the position range S of the target object 24 is determined in the detection image frame FD. In some embodiments of the present disclosure, the step of determining the position range S of the target object 24 in the detection image frame FD includes the following steps: The image block among the plurality of image blocks 23a that has the largest intersection ratio with the image black 22a of the work piece in the detection image frame FD can be selected, and the object to be labeled located in the selected image block can be defined as the target object 24. Such that, the position range S of the target object 24 can be the position range of the selected image block in the detection image frame FD.

Then, as shown in step S25 in FIG. 2, a retracing step is performed from the detection image frame FD to select an Nth retraced image frame FN (for example, the operation frame $K_0$) from the K consecutive operation frames $K_0$-$K_6$ and to obtain a labeled image of the target object 24 from the Nth retraced image frame FN according to the position range S (and a plurality of relative position ranges S') of the target object 24. The retracing step performed from the detected image frame FD includes sub-steps of:

estimating a plurality of relative position ranges S' in the retraced image frames (such as, the operation frames $K_2$-$K_0$) corresponding to the position range S of the target object 24 in the detection image frame FD according to the horizontal movement speed V of the assembly line 20 and the length L of the detection image frame FD; and selecting the Nth retraced image frame FN.

The sub-step of estimating the plurality of relative position ranges S' in the retraced image frames (such as, the operation frames $K_2$-$K_0$) corresponding to the position range S of the target object 24 in the detection image frame FD includes sub-steps as follows: The time required for the target object 24 to enter and move out of the detection image frame FD can be firstly calculated by dividing the horizontal movement speed V of the assembly line 20 by the length L of the detection image frame FD (V/L); the shift distance of each consecutive image frame (the K consecutive operation frames $K_0$-$K_6$) can be estimated according to the frame rate FPS of the M consecutive image frames $F_0$-$F_m$; and the relative position range S' in each of the retraced image frames (such as, the operation frames $K_2$-$K_0$) corresponding to the position range S of the target object 24 in the detection image frame FD can be estimated according to the shift time and the shift distance of each retraced image frame (such as, the operation frames $K_2$-$K_0$).

In some embodiments of the present disclosure, the number of N (for the Nth retraced image frame FN) can be obtained by calculating the Gaussian function of one-sixth frame rate of the M consecutive image frames $F_0$-$F_m$ (FPS/6): N=[FPS/6]. For example, in the present embodiment, the horizontal movement speed V (such as, V=58) can be defined as the number of the consecutive image frames that displaying the target object 24 entering the field of view to it leaving the field of view. The shift distance of each retraced image frame (each of the operation frames $K_0$-$K_2$) can be estimated by considering the size of the detection image frame FD (length×width, h×w), wherein the shift distance of each retraced image frame is approximately a multiple of the pixel length (referred to as "pixels") of the detection view frame FD:

pixels=int($w/V$)×int($FPS/6$)=int(1920/58)×int(30/6)
 =33×5

That is, each of the relative position ranges S' in each retraced image frame (each of the operation frames $K_0$-$K_2$) corresponding to the position range S of the target object 24 in the detection image frame FD (for example, the operation view frame $K_3$) can be obtained according to the pixels equation (i.e., the various multiples of the pixel length); at the same time, the relative position range of the retraced image black 22a' in each retraced image frame (each of the operation frames $K_0$-$K_2$) corresponding to the position range of the image block 22a in the detection image frame FD can be also obtained by the same way.

The sub-step of selecting the Nth retraced image frame FN includes selecting an operation frame, among the K consecutive operation frames $K_0$-$K_6$ and except the detection image frame FD, as the Nth retraced image frame FN in which the target object 24 is not intersected with the image block 22a of the work piece. The intersection ratio between the retraced image black 22a' and the relative position range S' is still the largest. And the image of the object to be labeled (such as, the plastic product) located in the relative position range S' in the Nth retraced image frame FN can be referred to as the labeled image (of the target object 24).

Subsequently, as shown in step S26 in FIG. 2, the labeled image (of the target object 24) is compared with images of the M consecutive image frames $F_0$-$F_m$ to find at least one other labeled image similar to the target object. In some embodiments of the present disclosure, the step of comparing the labeled image (of the target object 24) with the images of the M consecutive image frames $F_0$-$F_m$ includes applying an image association comparison technology based on an unsupervised learning algorithm. In the present embodiment, the step for performing the image correlation comparison includes steps as follows: Firstly, a feature extraction is performed to extract a plurality of feature parameters $P_1$-$P_n$ from the labeled image (of the target object 24); and the plurality of feature parameters $P_1$-$P_n$ are imported into the correlation comparison module 13 to find at least one other labeled image similar to the target object 24.

As shown in step S27 in FIG. 2, the labeled image of the target object and the at least one other labeled image similar to the target object are both transmitted to the database 14 of the objects automatic labeling system 10 and stored as the same labeled data set 14a to complete the automatic labeling of the target object 24.

In some embodiments of the present disclosure, another automatic labeling process can be performed by repeating the steps of S21 to S25 to label other types of objects that are subject different operating procedures carried out at the same station 21 or different stations (not shown) of the assembly line 20. For example, in some embodiments of present disclosure, the picking workers can wear gloves (not shown) of different colors serving as different styles work pieces to grab and pick out another specific type of plastic products (the objects to be labeled 23) serving as another target object from the conveyor belt at the same station 21 or different stations (not shown) of the assembly line 20. And another objects labeling process can be performed to label the another specific type of plastic products by repeating the steps of S21 to S25.

Comparing the objects automatic labeling method provided by the embodiments of the present disclosure with the traditional manual labeling operation, it can be found that: the labeling efficiency of the objects automatic labeling method provided by the embodiments of the present disclosure is 68 times that of the traditional manual labeling operation; The accuracy rate for selecting the detection image frame FD (determining that the picking worker's glove 22 has grasped the target object 24) of the present objects automatic labeling method is as high as 86.73%; and the accuracy rate (recall rate) for comparing the object image of the present objects automatic labeling method is as high as 92.68%. It can be seen that using the objects automatic labeling method provided by the embodiments of the present disclosure can greatly increase the data labeling efficiency and reduce the labor cost and time consumption for training and building an AI system. Moreover, since the objects automatic labeling method provided by the embodiments of the present disclosure is based on an objective criterion, which is whether the work piece in the operation process performs a specific operation against the target object (e.g., whether the picking worker's glove 22 grabs the specific target object 24), thus the problem of machine learning inaccuracy caused by human subjective bias can be obviated.

According to the above embodiments, an objects automatic labeling method and a system applying the same are provided. A two-stage AI module is applied to label objects to be labeled in M consecutive image frames captured at one station of an assembly line. Firstly, the AI module is train and built by manual verification, and the AI module is then used to determine the position range of a target object using a work piece participating in an operation process as a reference, wherein the work piece is operated against the target object during the operation process. After extracting the image feature parameters of the target object, an unsupervised learning algorithm (for example, association) is used to find at least one image similar to that of the target object in the M consecutive image frames according to these image feature parameters. The image of the target object and the at least one image similar to that of the target object are then stored as the same labeled data set.

It can greatly reduce the labor cost and time consumption by applying the AI module to perform data labeling. And since the data labeling is performed based on an objective criterion of whether the work piece is operated against the target object during the operation process, thus the inaccurate problem of machine learning caused by human subjective bias can be obviated.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An objects automatic labeling method, the method comprising:
    capturing M consecutive image frames at one station of an assembly line, wherein M is a positive integer greater than 1;
    performing an object detection step comprising:
    selecting a detection image frame that displays an operating procedures using a work piece against a target object from the M consecutive image frames; and
    determining a position range of the target object in the detection image frame;
    retracing from the detection image frame to select an Nth retraced image frame from the M consecutive image frames;
    obtaining a labeled image of the target object from the Nth retraced image frame according to the position range;
    comparing the labeled image with images of the M consecutive image frames to find at least one other labeled image similar to the target object; and
    storing both of the labeled image and the at least one other labeled image similar to the target object as a same labeled data set.

2. The objects automatic labeling method according to claim 1, wherein the step of selecting the detection image frame comprises:
    defining a plurality of image blocks of objects to be labeled and/or at least one image block of the work piece in each of the M consecutive image frames using an object detection module;
    selecting K consecutive image frames containing the at least one image block of the work piece from the M consecutive image frames, wherein K is a positive integer greater than 1;
    calculating an intersection ratio of the at least one image block of the work piece over each of the image blocks of objects to be labeled in each of the K consecutive operation frames; and
    selecting an image frames with a largest intersection ratio from the K consecutive operation frames serving as the detection image frame.

3. The objects automatic labeling method according to claim 2, wherein the object detection step further comprises:
selecting a plurality of image frames from the M consecutive image frames as training image frames, and training the training image frames in a manner of manual verification to build an artificial intelligence (AI) module; and
using the AI module to calculate the intersection ratio.

4. The objects automatic labeling method according to claim 2, wherein the largest intersection ratio is a largest overlapping area ratio of the at least one image block of the work piece over each of the image blocks of objects to be labeled in each of the K consecutive operation frames.

5. The objects automatic labeling method according to claim 2, wherein the objects to be labeled located in an image block with the largest intersection ratio is defined as the target object.

6. The objects automatic labeling method according to claim 2, wherein the step of selecting the Nth retraced image frame from the M consecutive image frames comprises selecting an operation frame, among the K consecutive operation frames as the Nth retraced image frame in which an image block of the target object is not intersected with the at least one image block of the work piece.

7. The objects automatic labeling method according to claim 2, wherein the step of determining the position range of the target object in the detection image frame comprises:
selecting an image block, among the plurality of image blocks of objects to be labeled, that has the largest intersection ratio in the detection image frame;
estimating a plurality of relative position ranges in each of the K consecutive operation frames corresponding to the selected image block that has the largest intersection ratio in the detection image frame according to a horizontal movement speed of the assembly line and a length of the detection image frame.

8. The objects automatic labeling method according to claim 1, wherein the assembly line comprises a conveyor belt, and the operating procedures comprises picking (sorting) out the target object by at least one glove.

9. The objects automatic labeling method according to claim 1, wherein the step of comparing the labeled image with images of the M consecutive image frames comprises applying an unsupervised learning algorithm for:
extracting a plurality of feature parameters from the labeled image; and
importing the plurality of feature parameters into a correlation comparison module to find the at least one other labeled image similar to the target object.

10. An objects automatic labeling system, the system comprising:
an image capture device, used for capturing M consecutive image frames at one station of an assembly line, wherein M is a positive integer greater than 1;
an object detection module, used for performing an object detection step comprising:
selecting a detection image frame that displays an operating procedures using a work piece against a target object from the M consecutive image frames;
determining a position range of the target object in the detection image frame;
retracing from the detection image frame to select an Nth retraced image frame from the M consecutive image frames; and
obtaining a labeled image of the target object from the Nth retraced image frame according to the position range; and
a correlation comparison module, used for performing a correlation comparison comprising:
comparing the labeled image with images of the M consecutive image frames to find at least one other labeled image similar to the target object; and
storing both of the labeled image and the at least one other labeled image similar to the target object as a same labeled data set.

11. The objects automatic labeling system according to claim 10, wherein the step of selecting the detection image frame comprises:
defining a plurality of image blocks of objects to be labeled and/or at least one image block of the work piece in each of the M consecutive image frames;
selecting K consecutive image frames containing the at least one image block of the work piece from the M consecutive image frames, wherein K is a positive integer greater than 1;
calculating an intersection ratio of the at least one image block of the work piece over each of the image blocks of objects to be labeled in each of the K consecutive operation frames; and
selecting an image frames with a largest intersection ratio from the K consecutive operation frames serving as the detection image frame.

12. The objects automatic labeling system according to claim 11, wherein the object detection step further comprises:
selecting a plurality of image frames from the M consecutive image frames as training image frames, and training the training image frames in a manner of manual verification to build an AI module; and
using the AI module to calculate the intersection ratio.

13. The objects automatic labeling system according to claim 11, wherein the largest intersection ratio is a largest overlapping area ratio of the at least one image block of the work piece over each of the image blocks of objects to be labeled in each of the K consecutive operation frames.

14. The objects automatic labeling system according to claim 11, wherein the objects to be labeled located in an image block with the largest intersection ratio is defined as the target object.

15. The objects automatic labeling system according to claim 11, wherein the step of selecting the Nth retraced image frame from the M consecutive image frames comprises selecting an operation frame, among the K consecutive operation frames as the Nth retraced image frame in which an image block of the target object is not intersected with the at least one image block of the work piece.

16. The objects automatic labeling system according to claim 11, wherein the step of determining the position range of the target object in the detection image frame comprises:
selecting an image block, among the plurality of image blocks of objects to be labeled, that has the largest intersection ratio in the detection image frame;
estimating a plurality of relative position ranges in each of the K consecutive operation frames corresponding to the selected image block that has the largest intersection ratio in the detection image frame according to a horizontal movement speed of the assembly line and a length of the detection image frame.

17. The objects automatic labeling system according to claim 10, wherein the assembly line comprises a conveyor belt, and the operating procedures comprises picking (sorting) out the target object by at least one glove.

18. The objects automatic labeling system according to claim 10, wherein the step of comparing the labeled image with images of the M consecutive image frames comprises applying an unsupervised learning algorithm for:
- extracting a plurality of feature parameters from the labeled image; and
- importing the plurality of feature parameters into the correlation comparison module to find the at least one other labeled image similar to the target object.

\* \* \* \* \*